Oct. 30, 1928.
H. M. SWARTLEY
WEIGHING DEVICE
Filed Feb. 2, 1927
1,689,978
Fig. 1.
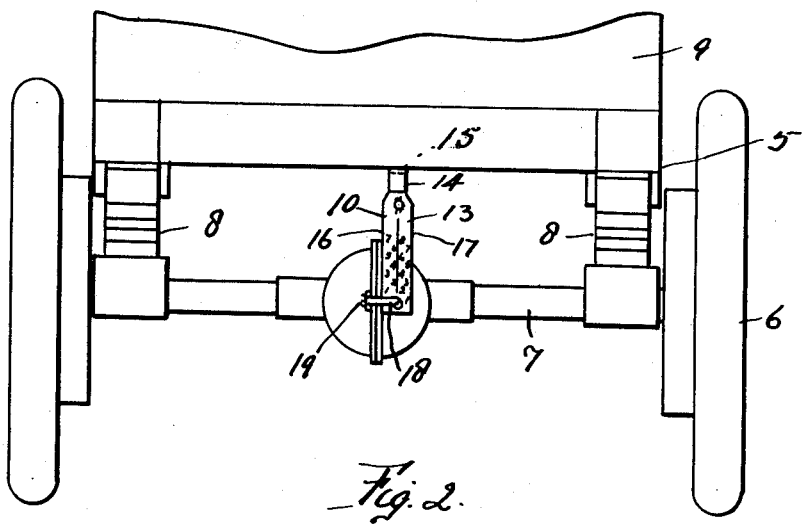
Fig. 2.
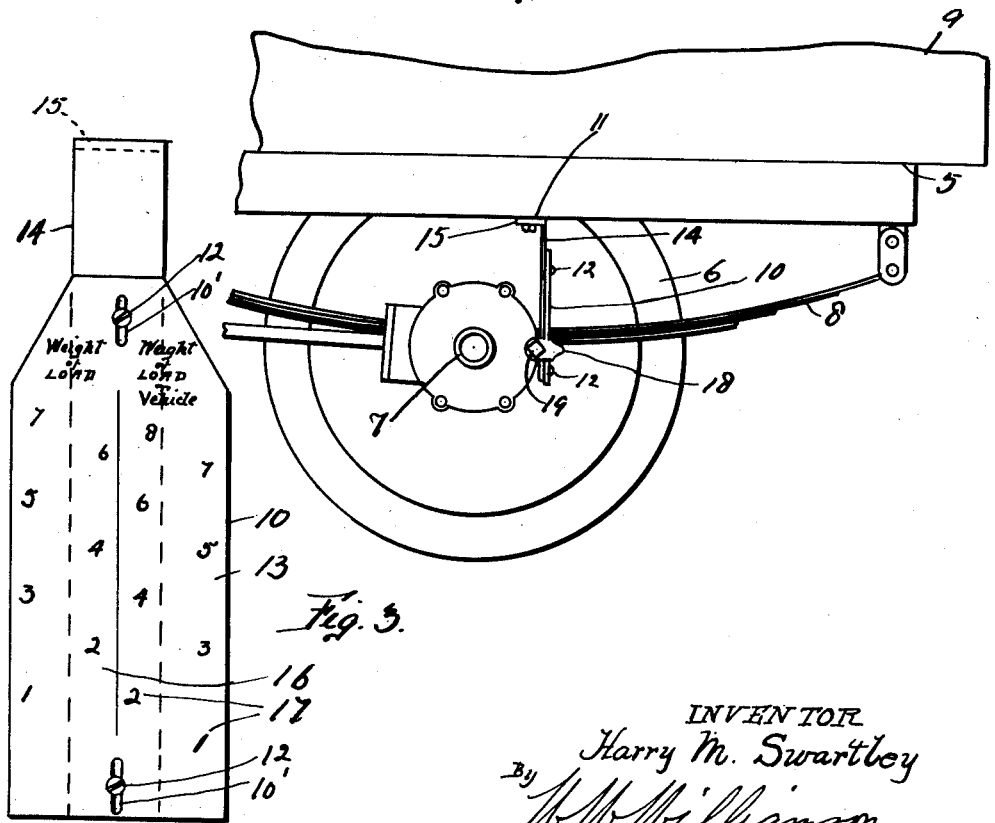
Fig. 3.
INVENTOR.
Harry M. Swartley
By H. W. Williamson
Atty.

Patented Oct. 30, 1928.

1,689,978

UNITED STATES PATENT OFFICE.

HARRY M. SWARTLEY, OF PHILADELPHIA, PENNSYLVANIA.

WEIGHING DEVICE.

Application filed February 2, 1927. Serial No. 165,351.

My invention relates to new and useful improvements in weighing devices, and more particularly a weight indicator for vehicles, and has for its primary object to improve the construction shown in my Patent Number 1,584,489, dated May 11, 1926.

Another object of the invention is to provide an exceedingly simple and effective device which will be relatively inexpensive in the cost of manufacture, although accurate in operation.

A further object of the invention is to provide for indicating the weight of the vehicle plus the weight of the load as well as the weight of said load, independent of the weight of the vehicle.

A still further object of the invention is to provide a weighing device or weight indicator consisting mainly of two parts attached to separate portions of a vehicle, so that the depression of the vehicle springs will indicate the weight of the load in the body.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a fragmentary rear view of a vehicle illustrating an application of the weighing device constructed in accordance with my invention.

Fig. 2, is a fragmentary side elevation of the vehicle with the near side wheel removed.

Fig. 3, is an enlarged face view of the scale plate.

In carrying out my invention as herein embodied, 5 represents the chassis of a vehicle including the wheels 6, axle 7, springs 8 and body 9, and it is to be understood that wherever the axle is referred to, this term is to cover the axle itself or any substitute therefor, or the housing which may surround the same, as is the case with the rear axle of an automobile or automotive truck.

At some suitable place on the under side of the body, which term is to cover the frame of the vehicle as well as the body per se, is secured a bracket 14 by means of a suitable fastening element 11, such as a bolt or screw. The fastening means actually passes through a lug 15 formed by bending a piece of the bracket at right angles to the main portion thereof.

On the main or vertical portion of the bracket is slidably or adjustably mounted for vertical movement a scale plate 10 attached to said bracket by screws 12 passing through slots 10' in the scale plate and threaded into the vertical portion of the bracket.

On the outer face of the scale plate are delineated two sets of scale 16 and 17, each being in vertical columnar form. The scales consist of suitable indication marks or numerals, and may represent pounds, hundreds of pounds, thousands of pounds or tons, as desired, and according to the size and type of vehicle on which the weighing device is to be used. For convenience of the present description, the numerals will be considered as representing tons.

As plainly shown in Fig. 3, the numerals of the scale 16 are of lower value than corresponding numerals of scale 17.

On some suitable portion of the vehicle, such as the part that is stationary relative to the body when the vehicle is standing a rest, such part preferably being the axle, or in the case of a motor truck, the housing surrounding such axle, has mounted a pointer 18 so arranged that its finger is in front of the scale plate, while through the shank which is at right angles to the finger, passes the fastening device 19 herein indicated as one of the bolts used for securing the parts of the differential housing together.

As will be obvious from the foregoing description when the parts are in the positions illustrated in Figs. 1 and 2, and when the vehicle body is formed downward due to locking thereof, the depression of the springs 8 or the movement of the body relative to the vehicle axle will be indicated by the pointer on the two scales delineated upon the outer face of the scale plate, but when the device is first attached to the vehicle, the weight of said vehicle should be ascertained, and the scale plate then adjusted so that, that numeral of the scale 17 indicating such weight will be opposite or will be associated with the pointer 18.

For instance, if the vehicle weighs one ton, the scale plate is adjusted on the bracket in such position that the numeral 1 of scale 17 will be associated with the pointer 18, then if the body is loaded, say with two tons of material, said body will be depressed until the numeral 2 of the scale 16 reaches a position opposite the pointer 18, thus indicating that the load in the body is two tons in weight; at the same time, the numeral 3 of the scale 17 will indicate that the weight of the load which is two tons plus the weight of the vehicle which is one ton, amounts to a total of three tons.

While such a device has many advantages believed unnecessary to mention, it is particularly adapted for readily determining whether or not the vehicle with its load may pass over bridges or into certain other structures, without danger of damage to such structures.

Of course I do not wish to be limited as to the exact details of construction as herein shown as these may be varied within the limits of the appended claims without departing from the spirit of my invention.

Having thus fully described my invention, what I claim as new and useful is:

1. In combination with a vehicle including a body and axle, a bracket secured to the under side of the body, an adjustable scale plate vertically mounted on said bracket and having two different scales thereon side by side in permanent relation, and a pointer secured to the axle for simultaneously indicating the weights represented on both scales.

2. In combination with a vehicle including a body and axle, a scale plate having two sets of scale indications delineated on one face side by side in columnar form, the indications on one scale for indicating a lower value than associated ones on the other scale, one of said scales adapted to indicate the weight of a load in the vehicle, and the other scale indicating the combined weights of said load and the vehicle, means to adjustably secure said scale plate to the vehicle body, a pointer, and means to secure said pointer to the vehicle in such relation to the scale plate as to simultaneously indicate the weights represented by the two scales.

In testimony whereof, I have hereunto affixed my signature.

HARRY M. SWARTLEY.